United States Patent
Iseki et al.

(10) Patent No.: US 12,398,295 B2
(45) Date of Patent: Aug. 26, 2025

(54) DOUBLE-SIDED ADHESIVE TAPE

(71) Applicant: NITTO DENKO CORPORATION, Osaka (JP)

(72) Inventors: Toru Iseki, Ibaraki (JP); Yusuke Yamanari, Ibaraki (JP); Makoto Saito, Ibaraki (JP); Mitsuhiro Kanada, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 206 days.

(21) Appl. No.: 17/908,405

(22) PCT Filed: Apr. 16, 2021

(86) PCT No.: PCT/JP2021/015656
§ 371 (c)(1),
(2) Date: Aug. 31, 2022

(87) PCT Pub. No.: WO2021/215354
PCT Pub. Date: Oct. 28, 2021

(65) Prior Publication Data
US 2023/0104276 A1    Apr. 6, 2023

(30) Foreign Application Priority Data

Apr. 22, 2020 (JP) .................................. 2020-075919
Apr. 14, 2021 (JP) .................................. 2021-068363

(51) Int. Cl.
*C09J 7/38* (2018.01)
*C09J 7/25* (2018.01)

(52) U.S. Cl.
CPC . *C09J 7/38* (2018.01); *C09J 7/25* (2018.01); *C09J 2301/124* (2020.08);
(Continued)

(58) Field of Classification Search
CPC . C09J 7/38; C09J 7/25; C09J 2301/124; C09J 2301/302; C09J 2301/312;
(Continued)

(56) References Cited

U.S. PATENT DOCUMENTS 10,550,298 B2  2/2020  Jozuka et al.
11,186,750 B2  11/2021 Yamanari et al.
(Continued)

FOREIGN PATENT DOCUMENTS

CN    107109148    8/2017
JP    2000-230159  8/2000
(Continued)

OTHER PUBLICATIONS

Machine Translation WO 2016075753 (Year: 2016).*
(Continued)

*Primary Examiner* — Philip C Tucker
*Assistant Examiner* — Christopher C Caillouet
(74) *Attorney, Agent, or Firm* — GREENBLUM & BERNSTEIN, P.L.C.

(57) ABSTRACT

Provided is a double-sided pressure-sensitive adhesive tape excellent in impact-absorbing property in the entirety of a wide temperature range, in particular, in a low-temperature region. The double-sided pressure-sensitive adhesive tape of the present invention includes: a base material layer; and pressure-sensitive adhesive layers arranged on both surface sides of the base material layer, wherein an entirety of the double-sided pressure-sensitive adhesive tape has a storage modulus of elasticity E' in a range of from $1.0 \times 10^5$ Pa to $1.0 \times 10^8$ Pa, which is measured at from $-25°$ C. to $120°$ C. and a frequency of 1 Hz.

7 Claims, 1 Drawing Sheet

(52) U.S. Cl.
CPC .... *C09J 2301/302* (2020.08); *C09J 2301/312* (2020.08); *C09J 2400/226* (2013.01)

(58) Field of Classification Search
CPC ............ C09J 2400/226; C09J 2203/318; C09J 2421/00; C09J 2433/00; C09J 2475/00; C09J 2483/00; C09J 201/00
See application file for complete search history.

(56) References Cited

U.S. PATENT DOCUMENTS

| 2017/0158918 A1 | 6/2017 | Jozuka et al. |
| 2020/0165489 A1 | 5/2020 | Yamanari et al. |

FOREIGN PATENT DOCUMENTS

| JP | 2011-162659 | 8/2011 |
| JP | 2013-249367 | 12/2013 |
| JP | 2014-94575 | 5/2014 |
| JP | 2016-029155 | 3/2016 |
| JP | 2016-117806 | 6/2016 |
| JP | 2016-175984 | 10/2016 |
| JP | 2017-57303 | 3/2017 |
| JP | 2018-9097 | 1/2018 |
| JP | 2019-65254 | 4/2019 |
| WO | 2016/075753 | 5/2016 |
| WO | 2019/059081 | 3/2019 |

OTHER PUBLICATIONS

China Office Action issued in CN Application No. 202180030239.1, dated Jan. 5, 2024.
International Search Report issued in International Patent Application No. PCT/JP2021/015656, dated Jun. 22, 2021, along with an English translation thereof.
Extended European search report issued in EP Patent Application No. 21793629.3, dated Apr. 16, 2024.
Written Opinion issued in International Application No. PCT/JP2021/015656, dated Jun. 22, 2021.
Japan, Third Party Observation received in JP Application No. 2021-068363, dated May 28, 2024.
Japan, Office Action issued in Japanese patent application No. 2021-068363, dated Mar. 18, 2025, and English language translation thereof.

\* cited by examiner

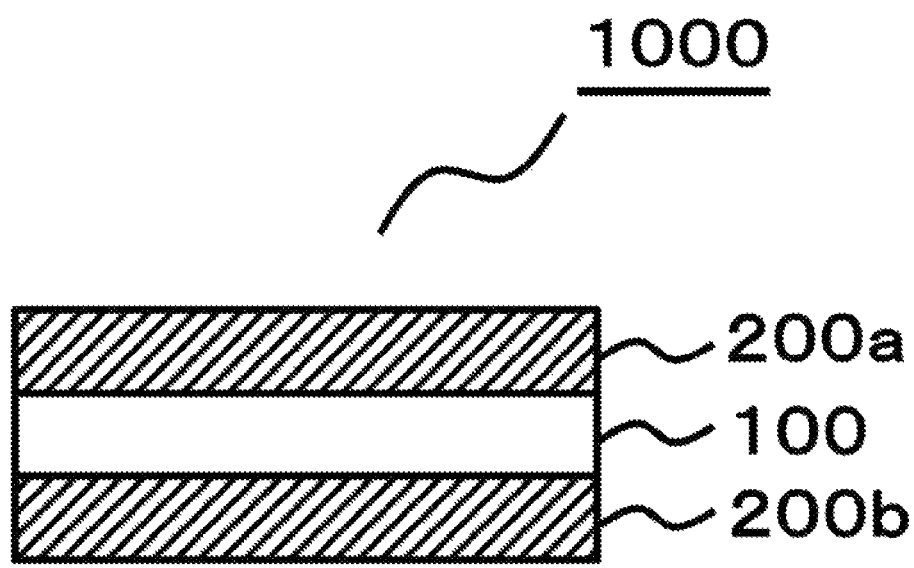

DOUBLE-SIDED ADHESIVE TAPE

TECHNICAL FIELD

The present invention relates to a double-sided pressure-sensitive adhesive tape.

BACKGROUND ART

When an impact is applied to a device with a display by its falling or the like, a problem in that the screen of the display breaks occurs.

In view of the foregoing, the adoption of a double-sided pressure-sensitive adhesive tape excellent in impact-absorbing property has been proposed for the purpose of absorbing such impact (e.g., Patent Literature 1).

However, there is a problem in that the impact-absorbing property of a related-art impact-absorbing pressure-sensitive adhesive tape reduces in the entirety of a wide temperature range, in particular, in a low-temperature region.

CITATION LIST

Patent Literature

[PTL 1] JP 2014-94575 A

SUMMARY OF INVENTION

Technical Problem

An object of the present invention is to provide a double-sided pressure-sensitive adhesive tape excellent in impact-absorbing property in the entirety of a wide temperature range, in particular, in a low-temperature region.

Solution to Problem

According to one embodiment of the present invention, there is provided a double-sided pressure-sensitive adhesive tape, including:
a base material layer; and
pressure-sensitive adhesive layers arranged on both surface sides of the base material layer,
wherein an entirety of the double-sided pressure-sensitive adhesive tape has a storage modulus of elasticity E' in a range of from $1.0 \times 10^5$ Pa to $1.0 \times 10^8$ Pa, which is measured at from $-25°$ C. to $120°$ C. and a frequency of 1 Hz.

In one embodiment, the base material layer has a storage modulus of elasticity E' in a range of from $1.0 \times 10^5$ Pa to $1.0 \times 10^8$ Pa, which is measured at from $-25°$ C. to $120°$ C. and a frequency of 1 Hz.

In one embodiment, the pressure-sensitive adhesive layers each have a maximum of a storage modulus of elasticity G' of $1.0 \times 10^{10}$ Pa or less, which is measured at from $-25°$ C. to $120°$ C. and a frequency of 1 Hz.

In one embodiment, the pressure-sensitive adhesive layers each have a pressure-sensitive adhesive strength to a SUS plate of 5 N/20 mm or more at $23°$ C. and 50% RH, a tensile rate of 300 mm/min, and a peel angle of $180°$.

In one embodiment, the base material layer contains at least one polar functional group-containing polymer selected from a condensation-type polymer and a polyaddition-type polymer.

In one embodiment, the polar functional group-containing polymer is at least one kind selected from polyamide, polyurethane, and polyurea.

In one embodiment, the polar functional group-containing polymer has at least one kind selected from an ether bond and an ester bond.

In one embodiment, the pressure-sensitive adhesive layers each contain at least one kind selected from an acrylic pressure-sensitive adhesive, a rubber-based pressure-sensitive adhesive, a silicone-based pressure-sensitive adhesive, and a urethane-based pressure-sensitive adhesive.

In one embodiment, the pressure-sensitive adhesive tape of the present invention is an impact-absorbing tape for a display.

Advantageous Effects of Invention

According to the present invention, the double-sided pressure-sensitive adhesive tape excellent in impact-absorbing property in the entirety of a wide temperature range, in particular, in a low-temperature region can be provided.

BRIEF DESCRIPTION OF DRAWINGS

FIG. 1 is a schematic sectional view for illustrating a double-sided pressure-sensitive adhesive tape according to one embodiment of the present invention.

DESCRIPTION OF EMBODIMENTS

<<<<Double-Sided Pressure-Sensitive Adhesive Tape>>>>

A double-sided pressure-sensitive adhesive tape according to an embodiment of the present invention is a pressure-sensitive adhesive tape including: a base material layer; and pressure-sensitive adhesive layers arranged on both the surface sides of the base material layer. That is, as illustrated in FIG. 1, a double-sided pressure-sensitive adhesive tape 1000 according to the embodiment of the present invention is a double-sided pressure-sensitive adhesive tape including: a base material layer 100; and pressure-sensitive adhesive layers 200a and 200b arranged on both the sides of the base material layer 100.

The pressure-sensitive adhesive layer 200a and the pressure-sensitive adhesive layer 200b may be pressure-sensitive adhesive layers identical to each other in composition, or may be pressure-sensitive adhesive layers different from each other in composition.

The pressure-sensitive adhesive layer 200a and the pressure-sensitive adhesive layer 200b may be identical to each other in thickness, or may be different from each other in thickness.

The number of the base material layers may be one, or two or more. The number of the base material layers is preferably one because the effect of the present invention can be further expressed.

The number of the pressure-sensitive adhesive layers may be one, or two or more. The number of the pressure-sensitive adhesive layers is preferably one because the effect of the present invention can be further expressed.

The double-sided pressure-sensitive adhesive tape according to the embodiment of the present invention may include any appropriate other layer except the base material layer and the pressure-sensitive adhesive layers to such an extent that the effect of the present invention is not impaired.

Any appropriate release liner may be arranged on the surface of each of the pressure-sensitive adhesive layers opposite to the base material layer for, for example, protecting the double-sided pressure-sensitive adhesive tape according to the embodiment of the present invention until its use.

Examples of the release liner include: a release liner obtained by subjecting the surface of a base material (liner base material), such as paper or a plastic film, to silicone treatment; and a release liner obtained by laminating a polyolefin-based resin on the surface of a base material (liner base material), such as paper or a plastic film. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release liner is preferably from 1 μm to 500 μm, more preferably from 3 μm to 450 μm, still more preferably from 5 μm to 400 μm, particularly preferably from 10 μm to 300 μm.

At least one surface of the release liner is preferably subjected to release treatment. Any appropriate release treatment may be adopted as the release treatment to such an extent that the effect of the present invention is not impaired.

The total thickness "d" of the double-sided pressure-sensitive adhesive tape according to the embodiment of the present invention is preferably from 1 μm to 500 μm, more preferably from 5 μm to 450 μm, still more preferably from 10 μm to 400 μm, particularly preferably from 15 μm to 350 μm, most preferably from 30 μm to 300 μm. When the total thickness "d" of the double-sided pressure-sensitive adhesive tape according to the embodiment of the present invention falls within the ranges, the effect of the present invention can be further expressed.

In the double-sided pressure-sensitive adhesive tape according to the embodiment of the present invention, the storage modulus of elasticity E' of the entirety of the double-sided pressure-sensitive adhesive tape measured at from −25° C. to 120° C. and a frequency of 1 Hz falls within the range of from $1.0 \times 10^5$ Pa to $1.0 \times 10^8$ Pa. The storage modulus of elasticity E' falls preferably within the range of from $3.0 \times 10^5$ Pa to $1.0 \times 10^8$ Pa, more preferably within the range of from $5 \times 10^5$ Pa to $1.0 \times 10^8$ Pa, still more preferably within the range of from $8.0 \times 10^5$ Pa to $9.9 \times 10^7$ Pa, particularly preferably within the range of from $1.0 \times 10^6$ Pa to $9.85 \times 10^7$ Pa. When the storage modulus of elasticity E' of the entirety of the double-sided pressure-sensitive adhesive tape falls within the ranges, a double-sided pressure-sensitive adhesive tape excellent in impact-absorbing property in the entirety of a wide temperature range, in particular, in a low-temperature region can be provided.

In the double-sided pressure-sensitive adhesive tape according to the embodiment of the present invention, the storage modulus of elasticity E' of the entirety of the double-sided pressure-sensitive adhesive tape measured at −25° C. and a frequency of 1 Hz is preferably $1.0 \times 10^8$ Pa or less, more preferably $9.9 \times 10^7$ Pa or less, still more preferably $9.75 \times 10^7$ Pa or less, particularly preferably $9.6 \times 10^7$ Pa or less. The lower limit value of the storage modulus of elasticity E' measured at −25° C. and a frequency of 1 Hz is preferably $5.0 \times 10^6$ Pa or more. When the storage modulus of elasticity E' of the entirety of the double-sided pressure-sensitive adhesive tape measured at −25° C. and a frequency of 1 Hz falls within the ranges, a double-sided pressure-sensitive adhesive tape that is more excellent in impact-absorbing property in the entirety of a wide temperature range, in particular, in a low-temperature region can be provided.

In the double-sided pressure-sensitive adhesive tape according to the embodiment of the present invention, the storage modulus of elasticity E' of the entirety of the double-sided pressure-sensitive adhesive tape measured at 23° C. and a frequency of 1 Hz is preferably $1.0 \times 10^8$ Pa or less, more preferably $3.0 \times 10^6$ Pa or less, still more preferably $2.5 \times 10^6$ Pa or less, particularly preferably $2.3 \times 10^6$ Pa or less. The lower limit value of the storage modulus of elasticity E' measured at 23° C. and a frequency of 1 Hz is preferably $5.0 \times 10^5$ Pa or more. When the storage modulus of elasticity E' of the entirety of the double-sided pressure-sensitive adhesive tape measured at 23° C. and a frequency of 1 Hz falls within the ranges, a double-sided pressure-sensitive adhesive tape that is more excellent in impact-absorbing property in the entirety of a wide temperature range, in particular, in a low-temperature region can be provided.

In the double-sided pressure-sensitive adhesive tape according to the embodiment of the present invention, the storage modulus of elasticity E' of the entirety of the double-sided pressure-sensitive adhesive tape measured at 80° C. and a frequency of 1 Hz is preferably $1.0 \times 10^8$ Pa or less, more preferably $3.0 \times 10^6$ Pa or less, still more preferably $2.9 \times 10^6$ Pa or less. The lower limit value of the storage modulus of elasticity E' measured at 80° C. and a frequency of 1 Hz is preferably $5.0 \times 10^5$ Pa or more. When the storage modulus of elasticity E' of the entirety of the double-sided pressure-sensitive adhesive tape measured at 80° C. and a frequency of 1 Hz falls within the ranges, a double-sided pressure-sensitive adhesive tape that is more excellent in impact-absorbing property in the entirety of a wide temperature range, in particular, in a low-temperature region can be provided.

In the double-sided pressure-sensitive adhesive tape according to the embodiment of the present invention, the ratio (storage modulus of elasticity E' (−25° C.)/storage modulus of elasticity E' (80° C.)) of the storage modulus of elasticity E' of the entirety of the double-sided pressure-sensitive adhesive tape measured at −25° C. and a frequency of 1 Hz to the storage modulus of elasticity E' thereof measured at 80° C. and a frequency of 1 Hz is preferably 40.0 or less, more preferably 35.0 or less, still more preferably 30.0 or less, particularly preferably 18.0 or less. The lower limit value of the ratio (storage modulus of elasticity E' (−25° C.)/storage modulus of elasticity E' (80° C.)) is preferably 1.0 or more. When the ratio (storage modulus of elasticity E' (−25° C.)/storage modulus of elasticity E' (80° C.)) of the storage modulus of elasticity E' of the entirety of the double-sided pressure-sensitive adhesive tape measured at −25° C. and a frequency of 1 Hz to the storage modulus of elasticity E' thereof measured at 80° C. and a frequency of 1 Hz falls within the ranges, a double-sided pressure-sensitive adhesive tape that is more excellent in impact-absorbing property in the entirety of a wide temperature range, in particular, in a low-temperature region can be provided.

In the double-sided pressure-sensitive adhesive tape according to the embodiment of the present invention, the storage modulus of elasticity E' of the base material layer measured at from −25° C. to 120° C. and a frequency of 1 Hz falls preferably within the range of from $1.0 \times 10^5$ Pa to $1.0 \times 10^8$ Pa, more preferably within the range of from $3.0 \times 10^5$ Pa to $8.0 \times 10^7$ Pa, still more preferably within the range of from $5.0 \times 10^5$ Pa to $5.0 \times 10^7$ Pa, particularly preferably within the range of from $1.0 \times 10^6$ Pa to $2.0 \times 10^7$ Pa. When the storage modulus of elasticity E' of the base material layer falls within the ranges, a double-sided pressure-sensitive adhesive tape that is more excellent in impact-absorbing property in the entirety of a wide temperature range, in particular, in a low-temperature region can be provided.

In the double-sided pressure-sensitive adhesive tape according to the embodiment of the present invention, the maximum of the storage modulus of elasticity G' of each of the pressure-sensitive adhesive layers measured at from −25° C. to 120° C. and a frequency of 1 Hz is preferably $1.0 \times 10^{10}$ Pa or less, and falls more preferably within the range of from $1.0 \times 10^2$ Pa to $5.0 \times 10^9$ Pa, still more preferably within the range of from $5.0 \times 10^2$ Pa to $1.0 \times 10^9$ Pa, particularly preferably within the range of from $1.0 \times 10^3$ Pa to $7.0 \times 10^8$ Pa. When the maximum of the storage modulus of elasticity G' of each of the pressure-sensitive adhesive layers falls within the ranges, a double-sided pressure-sensitive adhesive tape that is more excellent in impact-absorbing property in the entirety of a wide temperature range, in particular, in a low-temperature region can be provided.

In the double-sided pressure-sensitive adhesive tape according to the embodiment of the present invention, the pressure-sensitive adhesive layers each have a pressure-sensitive adhesive strength to a SUS plate of preferably 5 N/20 mm or more, more preferably from 5 N/20 mm to 100 N/20 mm, still more preferably from 5 N/20 mm to 50 N/20 mm, particularly preferably from 5 N/20 mm to 30 N/20 mm, most preferably from 5 N/20 mm to 20 N/20 mm at 23° C. and 50% RH, a tensile rate of 300 mm/min, and a peel angle of 180°. When the pressure-sensitive adhesive strength of each of the pressure-sensitive adhesive layers to the SUS plate at 23° C., 50% RH, a tensile rate of 300 mm/min, and a peel angle of 180° falls within the ranges, a double-sided pressure-sensitive adhesive tape that is more excellent in impact-absorbing property in the entirety of a wide temperature range, in particular, in a low-temperature region can be provided.

<<Base Material Layer>>

The thickness of the base material layer is preferably from 1 μm to 500 μm, more preferably from 2 μm to 400 μm, still more preferably from 3 μm to 300 μm, particularly preferably from 5 μm to 200 μm. When the thickness of the base material layer falls within the ranges, a double-sided pressure-sensitive adhesive tape that is more excellent in impact-absorbing property in the entirety of a wide temperature range, in particular, in a low-temperature region can be provided.

Any appropriate material may be adopted as a material for the base material layer to such an extent that the effect of the present invention is not impaired. Such material preferably contains at least one polar functional group-containing polymer selected from a condensation-type polymer and a polyaddition-type polymer. That is, the base material layer preferably contains the at least one polar functional group-containing polymer selected from the condensation-type polymer and the polyaddition-type polymer.

The content of the at least one polar functional group-containing polymer selected from the condensation-type polymer and the polyaddition-type polymer in the base material layer is preferably from 50 wt % to 100 wt %, more preferably from 70 wt % to 100 wt %, still more preferably from 90 wt % to 100 wt %, particularly preferably from 95 wt % to 100 wt %, most preferably from 98 wt % to 100 wt % because the effect of the present invention can be further expressed.

The at least one polar functional group-containing polymer selected from the condensation-type polymer and the polyaddition-type polymer has a polar functional group such as a carbonyl group in its polymer main chain. Accordingly, an intermolecular force stronger than that of a radical polymerization-type polymer acts on the polymer, and hence the polymer may have a network structure that does not depend on a covalent bond. A polymer having a large amount of a network structure that depends on a covalent bond has excessively high elasticity, and hence the unevenness followability of the pressure-sensitive adhesive tape may reduce. In the condensation-type polymer and the polyaddition-type polymer each having the network structure that does not depend on a covalent bond, the intermolecular force caused by the polar functional groups is weaker than an intermolecular force caused by a covalent bond, and hence a stress is easily relaxed by deformation or the like even with smaller energy (energy such as work done by the stress or the like). After the relaxation, an intermolecular force acts between the polar functional groups again (e.g., the combination of the polar functional groups between which an intermolecular force occurs changes). Thus, a double-sided pressure-sensitive adhesive tape that is more excellent in impact-absorbing property in the entirety of a wide temperature range, in particular, in a low-temperature region can be provided.

The polar functional group-containing polymer is preferably at least one kind selected from polyamide, polyurethane, and polyurea. The intermolecular force of a polymer containing a hydrogen-bondable polar functional group (more precisely, a hydrogen-bondable polar functional group having a hydrogen donor property), such as the polyamide, the polyurethane, or the polyurea, is said to be capable of being cleaved (the combination of the hydrogen-bondable functional groups of the polymer between which an intermolecular force occurs is said to be changed) by energy about $\frac{1}{10}$ as large as that of a covalent bond, and hence the cleavage of the intermolecular force may be effectively caused by thermal energy applied to the polymer at about room temperature or energy generated by work done by a stress or the like caused by the bending or the like of the pressure-sensitive adhesive tape. Thus, a double-sided pressure-sensitive adhesive tape that is more excellent in impact-absorbing property in the entirety of a wide temperature range, in particular, in a low-temperature region can be provided.

The base material layer more preferably contains a polar functional group-containing polymer that is the polyaddition-type polymer. In the polyaddition-type polymer, a monomer having various functional groups may be adopted, and an operation of transforming the monomer into the polymer is easy. Various properties can be imparted to the polyaddition-type polymer by exploiting those features.

The polar functional group-containing polymer that is the polyaddition-type polymer may have at least one kind selected from an ether bond and an ester bond. The ether bond may be introduced by adopting a monomer having an ether bond at the time of the production of the polyaddition-type polymer. The ester bond may be introduced by adopting a monomer having an ester bond at the time of the production of the polyaddition-type polymer. For example, when polyurethane is adopted as the polar functional group-containing polymer, polyurethane having an ether bond is, for example, ether-based polyurethane. Polyurethane having an ester bond is, for example, ester-based polyurethane.

The ether-based polyurethane is, for example, a urethane acrylate resin. The urethane acrylate resin may be obtained as a urethane acrylate resin film on a support base material, for example, as follows: a precursor containing a polyether segment, a (meth)acrylic segment, and a urethane segment is polymerized under a situation in which the molecular weight of an oligomer to be obtained can be controlled, to thereby produce an oligomer; then, various additives are added to the oligomer to produce a coating composition for forming a resin film; and the composition is applied onto the support base material and cross-linked. More specifically, the resin may be obtained as the urethane acrylate resin film on the support base material as follows: for example, polyether polyol, a compound containing an isocyanate group, and a hydroxyalkyl (meth)acrylate, or acrylic-modified polyether polyol and the compound containing an isocyanate group are polymerized in advance to produce a urethane acrylate oligomer; the additives are appropriately added to the oligomer to produce the coating composition for forming a resin film; and the composition is applied onto the support base material and cross-linked.

Examples of the polyether polyol include polyalkylene glycols, such as polyethylene glycol, polypropylene glycol, and polytetramethylene glycol, and various derivatives thereof.

Examples of the hydroxyalkyl (meth)acrylate include hydroxyethyl (meth)acrylate, hydroxypropyl (meth)acrylate, and hydroxybutyl (meth)acrylate.

Examples of the compound containing an isocyanate group include a resin containing an isocyanate group, an oligomer containing an isocyanate group, and a monomer containing an isocyanate group. Examples of the compound containing an isocyanate group include (poly)isocyanates, such as methylenebis-4-cyclohexyl isocyanate, a trimethylolpropane adduct of tolylene diisocyanate, a trimethylolpropane adduct of hexamethylene diisocyanate, a trimethylolpropane adduct of isophorone diisocyanate, an isocyanurate form of tolylene diisocyanate, an isocyanurate form of hexamethylene diisocyanate, and a biuret form of hexamethylene isocyanate, and blocked forms of those isocyanates.

Examples of the ester-based polyurethane include adipate-based (ester-based) polyurethane and polycaprolactone-based (ester-based) polyurethane.

When a monomer having an ether bond is adopted at the time of the production of the polyaddition-type polymer, the elasticity of the polyaddition-type polymer can be weakened, and molecular flexibility can be imparted thereto. When a monomer having an ester bond is adopted at the time of the production of the polyaddition-type polymer, stiffness can be imparted to the polyaddition-type polymer. Accordingly, the elasticity and stiffness of the polyaddition-type polymer may be adjusted by, for example, appropriately combining the monomer having an ether bond and the monomer having an ester bond, or adopting one of the monomers alone at the time of the production of the polyaddition-type polymer. Thus, a double-sided pressure-sensitive adhesive tape that is more excellent in impact-absorbing property in the entirety of a wide temperature range, in particular, in a low-temperature region can be provided.

When polyurethane (preferably the ether-based polyurethane or the ester-based polyurethane) is adopted as the polar functional group-containing polymer, a hydroxy group-containing monomer may be adopted at the time of the production of the polyurethane. When the hydroxy group-containing monomer is adopted at the time of the production of the polyurethane, an isocyanate monomer to be used in a polyaddition reaction at the time of the production of the polyurethane and the hydroxy group-containing monomer may react with each other to introduce a covalent-bondable network structure into the polyurethane. In addition, the hydroxy group-containing monomer can be collectively loaded as a raw material for the polyurethane, and hence labor such as the loading of the raw material for the polyurethane after the preparation of polyurethane can be simplified.

The polar functional group-containing monomer is preferably polyurethane (preferably the ether-based polyurethane or the ester-based polyurethane) because the effect of the present invention can be further expressed. The polyurethane is a polymer compound synthesized by subjecting a polyol (e.g., a diol) and a polyisocyanate (e.g., a diisocyanate) at predetermined ratios to a polyaddition reaction.

Examples of the polyurethane (preferably the ether-based polyurethane or the ester-based polyurethane) include thermoplastic polyurethane (TPU) and thermosetting polyurethane. Of those, the thermosetting polyurethane is preferred because a double-sided pressure-sensitive adhesive tape that is more excellent in impact-absorbing property in the entirety of a wide temperature range, in particular, in a low-temperature region can be provided. The thermosetting polyurethane is preferably at least one kind selected from the group consisting of: thermosetting ether-based polyurethane; and thermosetting ester-based polyurethane, and is more preferably at least one kind selected from a thermosetting urethane acrylate resin and a thermosetting polycaprolactone-based (ester-based) polyurethane resin because the effect of the present invention can be further expressed.

Examples of the polyol that may be used in the synthesis of the polyurethane include: diols, such as ethylene glycol, propylene glycol, 1,3-propanediol, 1,4-butanediol, 1,5-pentanediol, neopentyl glycol, 1,6-hexanediol, 1,8-octanediol, polyoxytetramethylene glycol, diethylene glycol, polyethylene glycol, and polypropylene glycol; polyester polyols each serving as a polycondensate of the diol and a dicarboxylic acid (e.g., adipic acid, azelaic acid, or sebacic acid); and carbonate diols such as a polyalkylene carbonate diol. The number of kinds of those polyols may be only one, or two or more.

Examples of the polyisocyanate that may be used in the synthesis of the polyurethane include aromatic, aliphatic, and alicyclic diisocyanates, and multimers (e.g., dimers or trimers) of those diisocyanates. Examples of the diisocyanate include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatomethyl)cyclohexane, methylcyclohexane diisocyanate, and m-tetramethylxylylene diisocyanate. The number of kinds of those polyisocyanates may be only one, or two or more.

In addition to the polyol and the polyisocyanate, any other copolymerizable component may be introduced into the polyurethane. Examples of the other copolymerizable component include a monocarboxylic acid, a dicarboxylic acid, a polycarboxylic acid that is trifunctional or more, a hydroxycarboxylic acid, an alkoxycarboxylic acid, and derivatives thereof. The number of kinds of the other copolymerizable components may be only one, or two or more. The content of the other copolymerizable component in the polyurethane is preferably less than 30 wt %, more preferably less than 10 wt %, still more preferably less than 5 wt %.

<<Pressure-Sensitive Adhesive Layers>>

The thickness of each of the pressure-sensitive adhesive layers is preferably from 1 μm to 500 μm, more preferably from 3 μm to 300 μm, still more preferably from 5 μm to 200 μm, particularly preferably from 10 μm to 120 μm. When the thickness of each of the pressure-sensitive adhesive layers falls within the ranges, a double-sided pressure-sensitive adhesive tape that is more excellent in impact-absorbing property in the entirety of a wide temperature range, in particular, in a low-temperature region can be provided.

The pressure-sensitive adhesive layers each contain a base polymer. The number of kinds of the base polymers may be only one, or two or more. The content of the base polymer in each of the pressure-sensitive adhesive layers is preferably from 30 wt % to 95 wt %, more preferably from 40 wt % to 90 wt %, still more preferably from 50 wt % to 80 wt % because the effect of the present invention can be further expressed.

The base polymer is preferably, for example, at least one kind selected from an acrylic polymer, a rubber-based polymer, a silicone-based polymer, and a urethane-based polymer because the effect of the present invention can be further expressed. That is, the pressure-sensitive adhesive layers each preferably contain at least one kind selected from an acrylic pressure-sensitive adhesive containing the acrylic polymer, a rubber-based pressure-sensitive adhesive containing the rubber-based polymer, a silicone-based pressure-sensitive adhesive containing the silicone-based polymer, and a urethane-based pressure-sensitive adhesive containing the urethane-based polymer. In the following description, the acrylic pressure-sensitive adhesive is described in detail as a typical example.

<Acrylic Pressure-Sensitive Adhesive>

The acrylic pressure-sensitive adhesive contains the acrylic polymer as its base polymer. The acrylic pressure-sensitive adhesive may contain a tackifying resin. The acrylic pressure-sensitive adhesive may contain a cross-linking agent.

When the acrylic pressure-sensitive adhesive contains the acrylic polymer, the tackifying resin, and the cross-linking agent, the content of the sum total amount of the acrylic polymer, the tackifying resin, and the cross-linking agent with respect to the total amount of the acrylic pressure-sensitive adhesive is preferably 95 wt % or more, more preferably 97 wt % or more, still more preferably 99 wt % or more because the effect of the present invention can be further expressed.

(Acrylic Polymer)

The acrylic polymer is preferably a polymerized product of monomer components that contain an alkyl (meth)acrylate as a main monomer and that may further sub-monomer having copolymerizability with the main monomer. The term "main monomer" as used herein refers to a component accounting for more than 50 wt % of the entirety of the monomer components.

For example, a compound represented by the following formula (1) may be suitably used as the alkyl (meth)acrylate.

$$CH_2=C(R^1)COOR^2 \quad (1)$$

Herein, in the formula (1), $R^1$ represents a hydrogen atom or a methyl group, and $R^2$ represents a chain-like alkyl group having 1 to 20 carbon atoms (hereinafter, such range of the number of carbon atoms is sometimes represented as "C1-20"). $R^2$ represents preferably a C1-14 chain-like alkyl group, more preferably a C2-10 chain-like alkyl group, still more preferably a C4-8 chain-like alkyl group from the viewpoint of, for example, the storage modulus of elasticity of the pressure-sensitive adhesive layer. The term "chain-like" as used herein is meant to comprehend a linear group and a branched group.

Examples of the alkyl (meth)acrylate in which $R^2$ represents a C1-20 chain-like alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate, and eicosyl (meth)acrylate. The number of kinds of those alkyl (meth)acrylates may be only one, or two or more.

The alkyl (meth)acrylate is preferably, for example, n-butyl acrylate (BA) or 2-ethylhexyl acrylate (2EHA) because the effect of the present invention can be further expressed.

The content of the alkyl (meth)acrylate in all the monomer components to be used in the synthesis of the acrylic polymer is preferably 55 wt % or more, more preferably 60 wt % or more, still more preferably 65 wt % or more, still more preferably 70 wt % or more, particularly preferably 85 wt % or more, most preferably 90 wt % or more because the effect of the present invention can be further expressed. The upper limit of the content of the alkyl (meth)acrylate is preferably 99.5 wt % or less, more preferably 99 wt % or less. However, the acrylic polymer may be obtained by polymerizing substantially only the alkyl (meth)acrylate.

When an alkyl (meth)acrylate in which $R^2$ represents a C4-8 chain-like alkyl group is used, the ratio of the alkyl (meth)acrylate in which $R^2$ represents a C4-8 chain-like alkyl group out of the alkyl (meth)acrylates in the monomer components is preferably 50 wt % or more, more preferably 70 wt % or more, still more preferably 90 wt % or more, particularly preferably 95 wt % or more, most preferably from 99 wt % to 100 wt % because the effect of the present invention can be further expressed.

As one embodiment (I) of the acrylic polymer, there is given such an acrylic polymer that n-butyl acrylate (BA) accounts for 80 wt % or more of all the monomer components. In this case, the content of n-butyl acrylate (BA) in all the monomer components is preferably from 82 wt % to 99 wt %, more preferably from 85 wt % to 98 wt %, still more preferably from 87 wt % to 97 wt %, particularly preferably from 89 wt % to 96 wt %, most preferably from 91 wt % to 95 wt % because the effect of the present invention can be further expressed.

As another embodiment (II) of the acrylic polymer, there is given such an acrylic polymer that n-butyl acrylate (BA) accounts for 50 wt % or more and less than 80 wt % of all the monomer components. In this case, the content of n-butyl acrylate (BA) in all the monomer components is preferably from 52 wt % and 80 wt % or less, more preferably from 55 wt % to 80 wt %, still more preferably from 60 wt % to 80 wt %, particularly preferably from 63 wt % to 80 wt %, most preferably from 65 wt % to 80 wt % because the effect of the present invention can be further expressed. In this embodiment, all the monomer components may further contain 2-ethylhexyl acrylate (2EHA) at a ratio smaller than that of n-butyl acrylate (BA).

As another embodiment (III) of the acrylic polymer, there is given such an acrylic polymer that 2-ethylhexyl acrylate (2EHA) accounts for less than 50 wt % of all the monomer components. In this case, the content of 2-ethylhexyl acrylate (2EHA) in all the monomer components is preferably more than 0 wt % and 48 wt % or less, more preferably from 5 wt % to 45 wt %, still more preferably from 10 wt % to 43 wt %, particularly preferably from 15 wt % to 40 wt %, most preferably from 20 wt % to 35 wt % because the effect of the present invention can be further expressed. All the monomer components may further contain n-butyl acrylate (BA) at a ratio larger than that of 2-ethylhexyl acrylate (2EHA).

As another embodiment (IV) of the acrylic polymer, there is given such an acrylic polymer that n-butyl acrylate (BA) accounts for 50 wt % or more of all the monomer components, and 2-ethylhexyl acrylate (2EHA) accounts for less than 50 wt % of all the monomer components. In this case, the content of n-butyl acrylate (BA) in all the monomer components is preferably from 52 wt % to 80 wt % or less, more preferably from 55 wt % to 80 wt %, still more preferably from 60 wt % to 80 wt %, particularly preferably from 63 wt % to 80 wt %, most preferably from 65 wt % to 80 wt % because the effect of the present invention can be further expressed. In addition, in this case, the content of 2-ethylhexyl acrylate (2EHA) in all the monomer components is preferably more than 0 wt % and 48 wt % or less, more preferably from 5 wt % to 45 wt %, still more preferably from 10 wt % to 43 wt %, particularly preferably from 15 wt % to 40 wt %, most preferably from 20 wt % to 35 wt % because the effect of the present invention can be further expressed.

The acrylic polymer may be copolymerized with any other monomer (A) to such an extent that the effect of the present invention is not impaired. The number of kinds of the other monomers (A) may be only one, or two or more. The other monomer (A) may be used for the purpose of, for example, adjusting the glass transition temperature (Tg) of the acrylic polymer or adjusting the pressure-sensitive adhesive performance thereof. As the other monomer (A) that may improve the cohesive strength and heat resistance of the pressure-sensitive adhesive, there are given, for example, a sulfonic acid group-containing monomer, a phosphoric acid group-containing monomer, a cyano group-containing monomer, a vinyl ester, and an aromatic vinyl compound. Of those, a vinyl ester is preferred. Specific examples of the vinyl ester include vinyl acetate (VAc), vinyl propionate, and vinyl laurate. Of those, vinyl acetate (VAc) is preferred.

The content of the other monomer (A) in all the monomer components is preferably from 0.001 wt % to 40 wt %, more preferably from 0.01 wt % to 40 wt %, still more preferably from 0.1 wt % to 20 wt %, particularly preferably from 0.5 wt % to 10 wt %, most preferably from 1 wt % to 5 wt %.

The acrylic polymer may be copolymerized with any other monomer (B) to such an extent that the effect of the present invention is not impaired. The number of kinds of the other monomers (B) may be only one, or two or more. The other monomer (B) is another monomer that may introduce a functional group capable of serving as a crosslinking base point into the acrylic polymer, or that may contribute to an improvement in adhesive strength, and examples thereof include a hydroxy group (OH group)-containing monomer, a carboxy group-containing monomer, an acid anhydride group-containing monomer, an amide group-containing monomer, an amino group-containing monomer, an imide group-containing monomer, an epoxy group-containing monomer, (meth)acryloylmorpholine, and a vinyl ether.

As one embodiment of the acrylic polymer, there is given an acrylic polymer copolymerized with the carboxy group-containing monomer as the other monomer (B). Examples of the carboxy group-containing monomer include acrylic acid (AA), methacrylic acid (MAA), carboxyethyl (meth)acrylate, carboxypentyl (meth)acrylate, itaconic acid, maleic acid, fumaric acid, crotonic acid, and isocrotonic acid. Of those, for example, acrylic acid (AA) or methacrylic acid (MAA) is preferred as the carboxy group-containing monomer because the effect of the present invention can be further expressed, and acrylic acid (AA) is more preferred.

When the carboxy group-containing monomer is adopted as the other monomer (B), the content of the other monomer (B) in all the monomer components is preferably from 0.1 wt % to 10 wt %, more preferably from 0.2 wt % to 8 wt %, still more preferably from 0.5 wt % to 5 wt %, particularly preferably from 0.7 wt % to 4 wt %, most preferably from 1 wt % to 3 wt % because the effect of the present invention can be further expressed.

The acrylic polymer may be copolymerized with any other monomer (C) to such an extent that the effect of the present invention is not impaired. The number of kinds of the other monomers (C) may be only one, or two or more. As the other monomer (C), there is given a hydroxy group-containing monomer. Examples of the hydroxy group-containing monomer include: hydroxyalkyl (meth)acrylates, such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate; polypropylene glycol mono(meth)acrylate; and N-hydroxyethyl(meth)acrylamide. Of those, for example, a hydroxyalkyl (meth)acrylate including a linear alkyl group having 2 to 4 carbon atoms is preferred as the hydroxy group-containing monomer because the effect of the present invention can be further expressed, and specific examples thereof include 2-hydroxyethyl acrylate (HEA) and 4-hydroxybutyl acrylate (4HBA).

When the hydroxy group-containing monomer is adopted as the other monomer (C), the content of the other monomer (C) in all the monomer components is preferably from 0.001 wt % to 10 wt %, more preferably from 0.01 wt % to 5 wt %, still more preferably from 0.02 wt % to 2 wt %, particularly preferably from 0.03 wt % to 1 wt %, most preferably from 0.04 wt % to 0.5 wt % because the effect of the present invention can be further expressed.

The Tg of the base polymer may be, for example, −80° C. or more because the effect of the present invention can be further expressed. The base polymer (suitably the acrylic polymer) is designed so that its Tg may be preferably −15° C. or less from the viewpoint of improving the deformability of the pressure-sensitive adhesive layer with respect to a shear direction. In some embodiments, the Tg of the base polymer is, for example, preferably −25° C. or less, more preferably −40° C. or less, still more preferably −50° C. or less. The base polymer is designed so that its Tg may be, for example, preferably −70° C. or more (more preferably −65° C. or more, still more preferably −60° C. or more) from the viewpoint of improving the cohesiveness and shape recoverability of the polymer.

The Tg of the base polymer refers to a value determined from Fox's equation on the basis of the Tg of a homopolymer of each monomer for forming the base polymer and the weight fraction (copolymerization ratio on a weight basis) of the monomer. As described below, Fox's equation is a relational equation between the Tg of a copolymer and the glass transition temperature Tgi of a homopolymer obtained by the homopolymerization of each of monomers for forming the copolymer.

$1/Tg=\Sigma(Wi/Tgi)$

In Fox's equation described above, Tg represents the glass transition temperature (unit: K) of the copolymer, Wi represents the weight fraction (copolymerization ratio on a weight basis) of a monomer "i" in the copolymer, and Tgi represents the glass transition temperature (unit: K) of the homopolymer of the monomer "i". A value described in a known material is adopted as the Tg of a homopolymer.

Specifically, for example, the following values may each be used as the Tg of a homopolymer.

| | |
|---|---|
| 2-Ethylhexyl acrylate | −70° C. |
| n-Butyl acrylate | −55° C. |
| Acrylic acid | 106° C. |
| 2-Hydroxyethyl acrylate | −15° C. |
| 4-Hydroxybutyl acrylate | −40° C. |

A numerical value described in "Polymer Handbook" (3rd edition, John Wiley & Sons, Inc., 1989) may be used as the Tg of a homopolymer except those listed above. When a plurality of numerical values are described in the above-mentioned "Polymer Handbook", a conventional value is adopted. With regard to a monomer that is not described in the above-mentioned "Polymer Handbook", the catalog value of the manufacturer of the monomer is adopted. A value obtained by a measurement method described in JP 2007-51271 A is used as the Tg of a homopolymer of a monomer which is not described in the above-mentioned "Polymer Handbook" and for which the catalog value of the manufacturer of the monomer is not provided.

Various polymerization methods known as approaches to synthesizing acrylic polymers, such as a solution polymerization method, an emulsion polymerization method, a bulk polymerization method, and a suspension polymerization method, may each be appropriately adopted as a method of obtaining the acrylic polymer. Of those polymerization methods, a solution polymerization method may be preferably used. A collective loading system involving supplying the total amount of the monomer components in one stroke, a continuous supply (dropping) system, a divided supply (dropping) system, or the like may be appropriately adopted as a monomer supply method at the time of the performance of the solution polymerization. A polymerization temperature may be appropriately selected in accordance with, for example, the kinds of the monomers and a solvent to be used, and the kind of a polymerization initiator. The polymerization temperature is preferably 20° C. or more, more preferably 30° C. or more, still more preferably 40° C. or more, and is preferably 170° C. or less, more preferably 160° C. or less, still more preferably 140° C. or less. Such active energy ray irradiation polymerization as described below may be adopted as the method of obtaining the acrylic polymer: photopolymerization performed (typically performed in the presence of a photopolymerization initiator) by irradiating the monomer components with light such as UV; or radiation polymerization performed by irradiating the monomer components with a radiation, such as a β ray or a γ ray.

The solvent (polymerization solvent) to be used in the solution polymerization may be appropriately selected from any appropriate organic solvents. Examples thereof include: aromatic compounds (typically aromatic hydrocarbons), such as toluene; acetic acid esters, such as ethyl acetate; and aliphatic or alicyclic hydrocarbons, such as hexane and cyclohexane.

The initiator (polymerization initiator) to be used in the polymerization may be appropriately selected from any appropriate polymerization initiators in accordance with the kind of the polymerization method. The number of kinds of the polymerization initiators may be only one, or two or more. Examples of such polymerization initiator include: azo-based polymerization initiators, such as 2,2'-azobisisobutyronitrile (AIBN); persulfuric acid salts, such as potassium persulfate; peroxide-based initiators, such as benzoyl peroxide and hydrogen peroxide; substituted ethane-based initiators, such as phenyl-substituted ethane; and aromatic carbonyl compounds. Other examples of the polymerization initiator include redox-type initiators each obtained by combining a peroxide and a reducing agent.

The usage amount of the polymerization initiator is preferably from 0.005 part by weight to 1 part by weight, more preferably from 0.01 part by weight to 1 part by weight with respect to 100 parts by weight of all the monomer components.

The acrylic polymer has a Mw of preferably from $10 \times 10^4$ to $500 \times 10^4$, more preferably from $10 \times 10^4$ to $150 \times 10^4$, still more preferably from $20 \times 10^4$ to $75 \times 10^4$, particularly preferably from $35 \times 10^4$ to $65 \times 10^4$. Herein, the Mw refers to a value in terms of standard polystyrene obtained by gel permeation chromatography (GPC). For example, a product available under the model name "HLC-8320GPC" (column: TSKgel GMH-H(S), manufactured by Tosoh Corporation) may be used as a GPC apparatus.

(Tackifying Resin)

The acrylic pressure-sensitive adhesive may contain a tackifying resin because the effect of the present invention can be further expressed. Examples of the tackifying resin include a rosin-based tackifying resin, a terpene-based tackifying resin, a hydrocarbon-based tackifying resin, an epoxy-based tackifying resin, a polyamide-based tackifying resin, an elastomer-based tackifying resin, a phenol-based tackifying resin, and a ketone-based tackifying resin. The number of kinds of the tackifying resins may be only one, or two or more.

The usage amount of the tackifying resin is preferably from 5 parts by weight to 70 parts by weight with respect to 100 parts by weight of the base polymer because the effect of the present invention can be further expressed, and the usage amount is more preferably from 10 parts by weight to 60 parts by weight, still more preferably from 15 parts by weight to 50 parts by weight, still further more preferably from 20 parts by weight to 45 parts by weight, particularly preferably from 25 parts by weight to 40 parts by weight.

The tackifying resin preferably contains a tackifying resin TL having a softening point of less than 105° C. because the effect of the present invention can be further expressed. The tackifying resin TL can effectively contribute to an improvement in deformability of the pressure-sensitive adhesive layer in its plane direction (shear direction). The softening point of a tackifying resin to be used as the tackifying resin TL is preferably from 50° C. to 103° C., more preferably from 60° C. to 100° C., still more preferably from 65° C. to 95° C., particularly preferably from 70° C. to 90° C., most preferably from 75° C. to 85° C. from the viewpoint of obtaining a higher deformability-improving effect.

The softening point of the tackifying resin is defined as a value measured on the basis of a softening point test method (ring and ball method) specified in JIS K5902 and JIS K2207. Specifically, the sample is forthwith fused at as low a temperature as possible, and the fused sample is filled into a ring placed on a flat metal plate while attention is paid so that no bubbles may occur therein. After the sample has been cooled, a portion rising from a plane including the upper end of the ring is cut off with a knife that has been somewhat heated. Next, a support (ring stand) is loaded into a glass vessel (heating bath) having a diameter of 85 mm or more and a height of 127 mm or more, and glycerin is poured into the vessel until its depth becomes 90 mm or more. Next, a steel ball (having a diameter of 9.5 mm and a weight of 3.5 g) and the ring filled with the sample are immersed in glycerin so as not to be in contact with each other, and the temperature of glycerin is kept at 20° C.±5° C. for 15 minutes. Next, the steel ball is mounted on the center of the surface of the sample in the ring, and the resultant is placed at a fixed position on the support. Next, a distance from the upper end of the ring to the surface of glycerin is kept at 50 mm. A temperature gauge is placed in the vessel, and the position of the center of the mercury ball of the temperature gauge is set at the same height as that of the center of the ring, followed by the heating of the vessel. The flame of a Bunsen burner to be used in the heating is brought into contact with a midpoint between the center and edge of the bottom of the vessel so that the heating may be uniformly performed. The rate at which the temperature of the bath increases after having reached 40° C. since the start of the heating needs to be 5.0° C.±0.5° C. per minute. A temperature when the sample gradually softens to flow down from the ring, and is finally brought into contact with the bottom plate of the ring is read, and the read temperature is adopted as the softening point. The simultaneous measurement of the softening points of two or more samples is performed, and the average of the measured values is adopted.

The usage amount of the tackifying resin TL is preferably from 5 parts by weight to 50 parts by weight with respect to 100 parts by weight of the base polymer because the effect of the present invention can be further expressed, and the usage amount is more preferably from 10 parts by weight to 45 parts by weight, still more preferably from 15 parts by weight to 40 parts by weight, particularly preferably from 20 parts by weight to 35 parts by weight, most preferably from 25 parts by weight to 32 parts by weight.

One or two or more kinds appropriately selected from those each having a softening point of less than 105° C. out of the tackifying resins listed above may each be adopted as the tackifying resin TL. The tackifying resin TL preferably contains a rosin-based resin.

Examples of the rosin-based resin that may be preferably adopted as the tackifying resin TL include rosin esters, such as an unmodified rosin ester and a modified rosin ester. An example of the modified rosin ester is a hydrogenated rosin ester.

The tackifying resin TL preferably contains a hydrogenated rosin ester because the effect of the present invention can be further expressed. The softening point of the hydrogenated rosin ester is preferably less than 105° C., more preferably from 50° C. to 100° C., still more preferably from 60° C. to 90° C., particularly preferably from 70° C. to 85° C., most preferably from 75° C. to 85° C. because the effect of the present invention can be further expressed.

The tackifying resin TL may contain a non-hydrogenated rosin ester. The term "non-hydrogenated rosin ester" as used herein is a concept comprehensively referring to those except the hydrogenated rosin ester out of the above-mentioned rosin esters. Examples of the non-hydrogenated rosin ester include an unmodified rosin ester, a disproportionated rosin ester, and a polymerized rosin ester.

The softening point of the non-hydrogenated rosin ester is preferably less than 105° C., more preferably from 50° C. to 100° C., still more preferably from 60° C. to 90° C., particularly preferably from 70° C. to 85° C., most preferably from 75° C. to 85° C. because the effect of the present invention can be further expressed.

The tackifying resin TL may contain any other tackifying resin in addition to the rosin-based resin. One or two or more kinds appropriately selected from those each having a softening point of less than 105° C. out of the tackifying resins listed above may each be adopted as the other tackifying resin. The tackifying resin TL may contain, for example, the rosin-based resin and a terpene resin.

The content of the rosin-based resin in the entirety of the tackifying resin TL is preferably more than 50 wt %, more preferably from 55 wt % to 100 wt %, still more preferably from 60 wt % to 99 wt %, particularly preferably from 65 wt % to 97 wt %, most preferably from 75 wt % to 97 wt % because the effect of the present invention can be further expressed.

The tackifying resin may contain the tackifying resin TL and a tackifying resin TH having a softening point of 105° C. or more (preferably from 105° C. to 170° C.) in combination because the effect of the present invention can be further expressed.

One or two or more kinds appropriately selected from those each having a softening point of 105° C. or more out of the tackifying resins listed above may each be adopted as the tackifying resin TH. The tackifying resin TH may contain at least one kind selected from rosin-based tackifying resins (e.g., rosin esters) and terpene-based tackifying resins (e.g., a terpene phenol resin)

(Cross-Linking Agent)

A cross-linking agent may be incorporated into the acrylic pressure-sensitive adhesive. The number of kinds of the cross-linking agents may be only one, or two or more. The use of the cross-linking agent can impart a moderate cohesive strength to the acrylic pressure-sensitive adhesive. The cross-linking agent may be useful in regulating an offset distance and a return distance in a holding power test. The acrylic pressure-sensitive adhesive containing the cross-linking agent may be obtained by, for example, forming the pressure-sensitive adhesive layer through use of a pressure-sensitive adhesive composition containing the cross-linking agent. The cross-linking agent may be incorporated in, for example, a post-cross-linking reaction form, a pre-cross-linking reaction form, a form partially subjected to a cross-linking reaction, or an intermediate or composite form thereof into the acrylic pressure-sensitive adhesive. In typical cases, the cross-linking agent is exclusively incorporated in the post-cross-linking reaction form into the acrylic pressure-sensitive adhesive.

The usage amount of the cross-linking agent is preferably from 0.005 part by weight to 10 parts by weight with respect to 100 parts by weight of the base polymer because the effect of the present invention can be further expressed, and the usage amount is more preferably from 0.01 part by weight to 7 parts by weight, still more preferably from 0.05 part by weight to 5 parts by weight, particularly preferably from 0.1 part by weight to 4 parts by weight, most preferably from 1 part by weight to 3 parts by weight.

Examples of the cross-linking agent include an isocyanate-based cross-linking agent, an epoxy-based cross-linking agent, a silicone-based cross-linking agent, an oxazoline-based cross-linking agent, an aziridine-based cross-linking agent, a silane-based cross-linking agent, an alkyl etherified melamine-based cross-linking agent, a metal chelate-based cross-linking agent, and a cross-linking agent such as a peroxide. Of those, an isocyanate-based cross-linking agent and an epoxy-based cross-linking agent are preferred because the effect of the present invention can be further expressed, and an isocyanate-based cross-linking agent is more preferred.

A compound having two or more isocyanate groups (including an isocyanate regenerative functional group obtained by temporarily protecting an isocyanate group by means of, for example, a blocking agent or oligomerization) in a molecule thereof may be used as the isocyanate-based cross-linking agent. Examples of the isocyanate-based cross-linking agent include: aromatic isocyanates, such as tolylene diisocyanate and xylene diisocyanate; alicyclic isocyanates, such as isophorone diisocyanate; and aliphatic isocyanates, such as hexamethylene diisocyanate.

More specific examples of the isocyanate-based cross-linking agent include: lower aliphatic polyisocyanates, such as butylene diisocyanate and hexamethylene diisocyanate; alicyclic isocyanates, such as cyclopentylene diisocyanate, cyclohexylene diisocyanate, and isophorone diisocyanate; aromatic diisocyanates, such as 2,4-tolylene diisocyanate, 4,4'-diphenylmethane diisocyanate, xylylene diisocyanate, and polymethylene polyphenyl isocyanate; isocyanate adducts, such as a trimethylolpropane/tolylene diisocyanate trimer adduct (e.g., product name: CORONATE L, manufactured by Tosoh Corporation), a trimethylolpropane/hexamethylene diisocyanate trimer adduct (e.g., product name: CORONATE HL, manufactured by Tosoh Corporation), and an isocyanurate form of hexamethylene diisocyanate (e.g., product name: CORONATE HX, manufactured by Tosoh Corporation); a trimethylolpropane adduct of xylylene diisocyanate (e.g., product name: TAKENATE D110N, manufactured by Mitsui Chemicals, Inc.), a trimethylolpropane adduct of xylylene diisocyanate (e.g., product name: TAKENATE D120N, manufactured by Mitsui Chemicals, Inc.), a trimethylolpropane adduct of isophorone diisocyanate (e.g., product name: TAKENATE D140N, manufactured by Mitsui Chemicals, Inc.), and a trimethylolpropane adduct of hexamethylene diisocyanate (e.g., product name: TAKENATE D160N, manufactured by Mitsui Chemicals, Inc.); polyether polyisocyanate, polyester polyisocyanate, and adducts of those compounds and various polyols; and polyisocyanates each of which is polyfunctionalized with an isocyanurate bond, a biuret bond, or an allophanate bond. Of those, aromatic isocyanates and alicyclic isocyanates are preferred from the viewpoint that the deformability and the cohesive strength can be well balanced.

The usage amount of the isocyanate-based cross-linking agent is preferably from 0.005 part by weight to 10 parts by weight with respect to 100 parts by weight of the base polymer because the effect of the present invention can be further expressed, and the usage amount is more preferably from 0.01 part by weight to 7 parts by weight, still more preferably from 0.05 part by weight to 5 parts by weight, particularly preferably from 0.1 part by weight to 4 parts by weight, most preferably from 1 part by weight to 3 parts by weight.

When the monomer components for forming the acrylic polymer contain a hydroxy group-containing monomer, a weight ratio "isocyanate-based cross-linking agent/hydroxy group-containing monomer" is preferably more than 20 and less than 50, more preferably from 22 to 45, still more preferably from 25 to 40, particularly preferably from 27 to 40, most preferably from 30 to 35 because the effect of the present invention can be further expressed.

When the acrylic pressure-sensitive adhesive contains the tackifying resin TL having a softening point of 105° C. or less, a weight ratio "tackifying resin TL/isocyanate-based cross-linking agent" is preferably more than 2 and less than 15, more preferably from 5 to 13, still more preferably from 7 to 12, particularly preferably from 7 to 11 because the effect of the present invention can be further expressed.

A polyfunctional epoxy compound having two or more epoxy groups in a molecule thereof may be used as the epoxy-based cross-linking agent. Examples of the epoxy-based cross-linking agent include N,N,N',N'-tetraglycidyl-m-xylenediamine, diglycidylaniline, 1,3-bis (N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcin diglycidyl ether, bisphenol-S-diglycidyl ether, and an epoxy-based resin having two or more epoxy groups in a molecule thereof. As a commercial product of the epoxy-based cross-linking agent, there is given, for example, a product available under the product name "TETRAD C" or "TETRAD X" from Mitsubishi Gas Chemical Company.

The usage amount of the epoxy-based cross-linking agent is preferably from 0.005 part by weight to 10 parts by weight with respect to 100 parts by weight of the base polymer because the effect of the present invention can be further expressed, and the usage amount is more preferably from 0.01 part by weight to 5 parts by weight, still more preferably from 0.015 part by weight to 1 part by weight, still further more preferably from 0.015 part by weight to 0.5 part by weight, particularly preferably from 0.015 part by weight to 0.3 part by weight, most preferably from 0.15 part by weight to 0.3 part by weight.

(Other Components)

The acrylic pressure-sensitive adhesive may contain any one of various additives that are general in the field of a pressure-sensitive adhesive, such as a colorant (a pigment, a dye, or the like), a leveling agent, a cross-linking aid, a plasticizer, a softening agent, a filler, an antistatic agent, an age resistor, a UV absorber, an antioxidant, and a light stabilizer, as required. Conventionally known additives may be used as such various additives by ordinary methods.

When the colorant (the pigment, the dye, or the like) is adopted as the other component, its usage amount is preferably from 0.001 part by weight to 10 parts by weight, more preferably from 0.01 part by weight to 5 parts by weight, still more preferably from 0.05 part by weight to 1 part by weight, particularly preferably from 0.1 part by weight to 1 part by weight with respect to 100 parts by weight of the base polymer.

<<<<Applications>>>>

The double-sided pressure-sensitive adhesive tape according to the embodiment of the present invention is excellent in impact-absorbing property in the entirety of a wide temperature range, in particular, in a low-temperature region. The double-sided pressure-sensitive adhesive tape according to the embodiment of the present invention may be used as, for example, an impact-absorbing tape for a display by taking advantage of the feature.

EXAMPLES

Now, the present invention is more specifically described by way of Examples and Comparative Example. However, the present invention is by no means limited thereto. In the following description, the terms "part(s)" and "%" are by weight unless otherwise stated.

<Measurement of Storage Modulus of Elasticity E' of Entirety of Double-Sided Pressure-Sensitive Adhesive Tape>

RSA-G2 (TA Instruments Japan Inc.) was used as a dynamic viscoelasticity-measuring apparatus, and a sample having a sheet width of 10 mm was set in the tensile jig of the measuring apparatus at measurement intervals of 20 mm, followed by the changing of a measurement environment oven to a measurement start temperature. The stabilization of the temperature of the measurement environment was recognized, and the temperature of the sample was increased from a lower limit temperature in a predetermined measurement temperature range at a rate of temperature increase of 5° C./min. Tensile deformation was applied to the sample at a frequency of 1 Hz at the time of the measurement, and a stress to be produced was calculated as the storage modulus of elasticity E' of the sample while the deformation strain amount thereof was controlled in such a region that the sheet did not undergo any permanent deformation.

<Measurement of Storage Modulus of Elasticity E' of Base Material Layer>

RSA-G2 (TA Instruments Japan Inc.) was used as a dynamic viscoelasticity-measuring apparatus, and a sample having a sheet width of 10 mm was set in the tensile jig of the measuring apparatus at measurement intervals of 20 mm, followed by the changing of a measurement environment oven to a measurement start temperature. The stabilization of the temperature of the measurement environment was recognized, and the temperature of the sample was increased from a lower limit temperature in a predetermined measurement temperature range at a rate of temperature increase of 5° C./min. Tensile deformation was applied to the sample at a frequency of 1 Hz at the time of the measurement, and a stress to be produced was calculated as the storage modulus of elasticity E' of the sample while the deformation strain amount thereof was controlled in such a region that the sheet did not undergo any permanent deformation.

<Measurement of Storage Modulus of Elasticity G' of Pressure-Sensitive Adhesive Layer>

ARES-G2 (TA Instruments Japan Inc.) was used as a dynamic viscoelasticity-measuring apparatus, and a sample having a sheet thickness of from 1 mm to 2 mm was set in the predetermined jig of the measuring apparatus, followed by the changing of a measurement environment oven to a measurement start temperature. The stabilization of the temperature of the measurement environment was recognized, and the temperature of the sample was increased from a lower limit temperature in a predetermined measurement temperature range at a rate of temperature increase of 5° C./min. Shear deformation was applied to the sample at a frequency of 1 Hz at the time of the measurement, and a stress to be produced was calculated as the storage modulus of elasticity G' of the sample while the deformation strain amount thereof was controlled in such a region that the sheet did not undergo any permanent deformation.

<Pressure-Sensitive Adhesive Strength>

The pressure-sensitive adhesive strength of a pressure-sensitive adhesive tape refers to a 180-degree peel strength (180-degree peeling pressure-sensitive adhesive strength) to a stainless-steel plate. The 180-degree peel strength was measured as described below. A single-sided pressure-sensitive adhesive tape (product name: "No. 31B", manufactured by Nitto Denko Corporation, total thickness: 50 µm) was bonded to the pressure-sensitive adhesive layer surface of any one of the two pressure-sensitive adhesive layers of the pressure-sensitive adhesive tape, and then the pressure-sensitive adhesive tape was cut into a size measuring 20 mm wide by 100 mm long to provide a measurement sample. Under an environment at 23° C. and 50% RH, a 2-kilogram roll was reciprocated once to pressure-bond the adhesive surface of the measurement sample onto the surface of a stainless-steel plate (SUS304BA plate). The resultant was left to stand under the environment for 30 minutes, and then its peel strength (N/20 mm) was measured with a universal tensile and compression testing machine in conformity with JIS Z 0237:2000 under the conditions of a tensile rate of 300 mm/min and a peel angle of 180°. A testing machine available under the product name "Autograph AG-10G Tensile Tester" from Shimadzu Corporation was used as the universal tensile and compression testing machine.

<Impact-Absorbing Property>

An impact-absorbing property is represented by a pressure when an iron ball is caused to fall. A double-sided pressure-sensitive adhesive tape cut into a size measuring 70 mm by 70 mm was placed on a stainless-steel plate (SUS plate: 10 mm by 150 mm by 150 mm) with their centers aligned with each other. A pressure-measuring film measuring 70 mm by 70 mm (manufactured by FUJIFILM Corporation, PRESCALE (TYPE MS)) was placed on the tape with their centers aligned with each other. Another stainless-steel plate (SUS plate: 5 mm by 70 mm by 70 mm) was placed on the film with their centers aligned with each other, and an iron ball (96 g) was caused to fall from a height of 40 cm toward the center. Next, the pressure-measuring film was removed, and an image thereof was captured with a pressure image analyzer SCANNER GT-F740 (manufactured by FUJIFILM Corporation), followed by the analysis of a pressure with a PRESCALE pressure image analysis system FPD-8010J (manufactured by FUJIFILM Corporation).

Example 1

68 Parts of n-butyl acrylate (BA), 29 parts of 2-ethylhexyl acrylate (2EHA), 3 parts of acrylic acid (AA), and 0.04 part of 4-hydroxybutyl acrylate (4HBA) serving as monomer components, 0.07 part of 2,2'-azobisisobutyronitrile (AIBN) serving as a polymerization initiator, and 151 parts of toluene serving as a polymerization solvent were loaded into a reaction vessel including a stirring machine, a temperature gauge, a nitrogen gas-introducing tube, and a condenser, and were subjected to solution polymerization at 65° C. for 5 hours and then at 80° C. for 2 hours to provide a toluene solution of an acrylic polymer (A). The acrylic polymer (A) had a weight-average molecular weight of 440,000.

30 Parts of a tackifying resin (manufactured by Harima Chemicals, Inc., hydrogenated rosin glycerin ester, product name: "HARITACK SE10") and 3 parts of an isocyanate-based cross-linking agent (manufactured by Tosoh Corporation, product name: "CORONATE L") were added to 100 parts of the acrylic polymer (A) in the toluene solution. Thus, a pressure-sensitive adhesive composition (A) was prepared.

Two commercial release liners (manufactured by Mitsubishi Chemical Corporation, product name: "DIAFOIL MRF #50" (biaxially stretched polyester film-based release liners each having a release-treated layer on one surface thereof, thickness: 50 µm)) were prepared. The pressure-sensitive adhesive composition (A) was applied to one surface (release surface) of each of the release liners so that its thickness after drying became 50 µm, followed by drying at 120° C. for 5 minutes. Thus, 50-micrometer thick pressure-sensitive adhesive layers (a first pressure-sensitive adhesive layer and a second pressure-sensitive adhesive layer) each including an acrylic pressure-sensitive adhesive (A) corresponding to the pressure-sensitive adhesive composition (A) were formed on the release surfaces of the two release liners.

A thermosetting polyurethane resin film having a thickness of 100 μm (manufactured by Toray Industries, Inc., polycaprolactone-based (ester-based) polyurethane resin film having a thickness of 100 μm (100% modulus=1.8 MPa)) was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once. After that, the resultant was aged in an oven at 50° C. for 3 days. Thus, a pressure-sensitive adhesive tape (1) was obtained.

The results are shown in Table 1.

Example 2

100 Parts of n-butyl acrylate (BA), 5 parts of vinyl acetate (VAc), 3 parts of acrylic acid (AA), and 0.1 part of 2-hydroxyethyl acrylate (HEA) serving as monomer components, 0.25 part of 2,2'-azobisisobutyronitrile (AIBN) serving as a polymerization initiator, and 200 parts of toluene serving as a polymerization solvent were loaded into a reaction vessel including a stirring machine, a temperature gauge, a nitrogen gas-introducing tube, and a condenser, and were subjected to solution polymerization at 60° C. for 6 hours and then at 75° C. for 3 hours to provide a toluene solution of an acrylic polymer (B). The acrylic polymer (B) had a weight-average molecular weight of 550,000.

10 Parts of a tackifying resin (manufactured by Harima Chemicals, Inc., polymerized rosin ester, product name: "HARITACK PCJ"), 10 parts of another tackifying resin (manufactured by Harima Chemicals, Inc., hydrogenated rosin glycerin ester, product name: "HARITACK SE10"), 5 parts of still another tackifying resin (manufactured by Rika Hercules Inc., product name: "HERCOLYN D"), 15 parts of phenol-modified rosin (manufactured by Sumitomo Bakelite Co., Ltd., product name: "SUMILITE PR12603N"), and 2 parts of an isocyanate-based cross-linking agent (manufactured by Tosoh Corporation, product name: "CORONATE L") were added to 100 parts of the acrylic polymer (B) in the toluene solution to prepare a pressure-sensitive adhesive composition (B).

Two commercial release liners (manufactured by Mitsubishi Chemical Corporation, product name: "DIAFOIL MRF #50" (biaxially stretched polyester film-based release liners each having a release-treated layer on one surface thereof, thickness: 50 μm)) were prepared. The pressure-sensitive adhesive composition (B) was applied to one surface (release surface) of each of the release liners so that its thickness after drying became 50 μm, followed by drying at 120° C. for 5 minutes. Thus, 50-micrometer thick pressure-sensitive adhesive layers (a first pressure-sensitive adhesive layer and a second pressure-sensitive adhesive layer) each including an acrylic pressure-sensitive adhesive (B) corresponding to the pressure-sensitive adhesive composition (B) were formed on the release surfaces of the two release liners.

A thermosetting polyurethane resin film (manufactured by Toray Industries, Inc., polycaprolactone-based (ester-based) polyurethane resin film having a thickness of 100 μm (100% modulus=1.8 MPa)) was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once. After that, the resultant was aged in an oven at 50° C. for 3 days. Thus, a pressure-sensitive adhesive tape (2) was obtained.

The results are shown in Table 1.

Example 3

100 Parts of n-butyl acrylate (BA), 3 parts of vinyl acetate (VAc), 2 parts of acrylic acid (AA), and 0.2 part of 2-hydroxyethyl acrylate (HEA) serving as monomer components, 0.25 part of 2,2'-azobisisobutyronitrile (AIBN) serving as a polymerization initiator, and 200 parts of toluene serving as a polymerization solvent were loaded into a reaction vessel including a stirring machine, a temperature gauge, a nitrogen gas-introducing tube, and a condenser, and were subjected to solution polymerization at 60° C. for 6 hours and then at 75° C. for 3 hours to provide a toluene solution of an acrylic polymer (C). The acrylic polymer (C) had a weight-average molecular weight of 600,000.

10 Parts of a tackifying resin (manufactured by Harima Chemicals, Inc., polymerized rosin ester, product name: "HARITACK PCJ"), 10 parts of another tackifying resin (manufactured by Harima Chemicals, Inc., hydrogenated rosin glycerin ester, product name: "HARITACK SE10"), 5 parts of still another tackifying resin (manufactured by Rika Hercules Inc., product name: "HERCOLYN D"), 15 parts of phenol-modified rosin (manufactured by Sumitomo Bakelite Co., Ltd., product name: "SUMILITE PR12603N"), 2 parts of an isocyanate-based cross-linking agent (manufactured by Tosoh Corporation, product name: "CORONATE L"), and 0.2 part of a black pigment (manufactured by Dainichiseika Color & Chemicals Mfg. Co., Ltd., "NAF-5091 BLACK") were added to 100 parts of the acrylic polymer (C) in the toluene solution to prepare a pressure-sensitive adhesive composition (C).

Two commercial release liners (manufactured by Mitsubishi Chemical Corporation, product name: "DIAFOIL MRF #50" (biaxially stretched polyester film-based release liners each having a release-treated layer on one surface thereof, thickness: 50 μm)) were prepared. The pressure-sensitive adhesive composition (C) was applied to one surface (release surface) of each of the release liners so that its thickness after drying became 50 μm, followed by drying at 120° C. for 5 minutes. Thus, 50-micrometer thick pressure-sensitive adhesive layers (a first pressure-sensitive adhesive layer and a second pressure-sensitive adhesive layer) each including an acrylic pressure-sensitive adhesive (C) corresponding to the pressure-sensitive adhesive composition (C) were formed on the release surfaces of the two release liners.

50 Parts of toluene, 330 parts of polytetramethylene glycol (manufactured by Mitsubishi Chemical Corporation, PTMG2000), 50 parts of hexamethylene diisocyanate, 2 parts of isocyanurate-modified type hexamethylene diisocyanate (manufactured by Mitsui Chemicals, Inc., TAKENATE (trademark) D-170N), 0.02 part of dibutyltin laurate, 0.02 part of hydroquinone monomethyl ether, and 11 parts of 2-hydroxyethyl acrylate were mixed, and the mixture was held at 70° C. for 5 hours. Next, the mixture was diluted with toluene to provide a toluene solution of an oligomer A having a solid content concentration of 60 wt %. 100 Parts of the resultant toluene solution of the oligomer A having a solid content concentration of 60 wt %, 5 parts of a hindered phenol-based antioxidant (manufactured by BASF Japan Ltd., IRGANOX 1010), and 1.5 parts of a photopolymerization initiator (manufactured by BASF Japan Ltd., IRGACURE 184) were mixed, and the mixture was diluted with methyl ethyl ketone to provide a coating composition (Q) for forming a resin film having a solid content concentration of 40 wt %.

A 50-micrometer thick polyester film having arranged thereon a release layer (manufactured by Toray Industries, Inc., product name: "LUMIRROR (trademark) R75X") was used as a support base material, and the coating composition (Q) for forming a resin film was applied onto the release layer of the support base material with a continuous application apparatus based on a slot die coater while its ejection flow rate was adjusted so that the thickness of a resin film to be obtained after the curing of the composition became 100 μm. The composition was dried and cured, and the resin film was peeled from the support base material. Thus, a thermosetting urethane acrylate resin film (R) having a thickness of 100 μm (100% modulus=2.0 MPa) was obtained. The composition was dried at a temperature of 80° C., and was cured with UV light under the conditions of an irradiation output of 400 mW/cm$^2$ and an integrated light quantity of 1,200 mJ/cm$^2$.

The resultant thermosetting urethane acrylate resin film (R) was used as a base material layer, and the first pressure-sensitive adhesive layer and the second pressure-sensitive adhesive layer formed on the above-mentioned two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once. After that, the resultant was aged in an oven at 50° C. for 3 days. Thus, a pressure-sensitive adhesive tape (3) was obtained.

The results are shown in Table 1.

Example 4

A pressure-sensitive adhesive tape (4) was obtained in the same manner as in Example 3 except that the blending amount of the black pigment (manufactured by Dainichiseika Color & Chemicals Mfg. Co., Ltd., "NAF-5091 BLACK") was changed to 0.6 part.

The results are shown in Table 1.

Example 5

A pressure-sensitive adhesive tape (5) was obtained in the same manner as in Example 3 except that the base material layer was changed to a thermosetting polyurethane resin film (manufactured by Toray Industries, Inc., polycaprolactone-based (ester-based) polyurethane resin film having a thickness of 100 μm (100% modulus=1.8 MPa).

The results are shown in Table 1.

Example 6

A pressure-sensitive adhesive tape (6) was obtained in the same manner as in Example 5 except that the blending amount of the black pigment (manufactured by Dainichiseika Color & Chemicals Mfg. Co., Ltd., "NAF-5091 BLACK") was changed to 0.6 part. The results are shown in Table 1.

Comparative Example 1

A pressure-sensitive adhesive tape (C1) was obtained in the same manner as in Example 1 except that a thermoplastic polyurethane resin film having a thickness of 100 μm (manufactured by Okura Industrial Co., Ltd., urethane elastomer film, product name: "SILKLON") was used as a base material layer.

The results are shown in Table 1.

Comparative Example 2

A pressure-sensitive adhesive tape (C2) was obtained in the same manner as in Example 2 except that a thermoplastic polyurethane resin film having a thickness of 100 μm (manufactured by Okura Industrial Co., Ltd., urethane elastomer film, product name: "SILKLON") was used as a base material layer. The results are shown in Table 1.

Comparative Example 3

95 Parts of n-butyl acrylate (BA) and 5 parts by weight of acrylic acid (AA) serving as monomer components, 0.25 part of 2,2'-azobisisobutyronitrile (AIBN) serving as a polymerization initiator, and 234 parts of ethyl acetate serving as a polymerization solvent were loaded into a reaction vessel including a stirring machine, a temperature gauge, a nitrogen gas-introducing tube, and a condenser, and were subjected to solution polymerization at 65° C. for 9 hours to provide an ethyl acetate solution of an acrylic polymer (D). The acrylic polymer (D) had a weight-average molecular weight of 600,000.

30 Parts of a tackifying resin (manufactured by Yasuhara Chemical Co., Ltd., terpene phenol resin, product name: "YS POLYSTER 5145"), 2 parts of an isocyanate-based cross-linking agent (manufactured by Tosoh Corporation, product name: "CORONATE L"), and 0.01 part of an epoxy-based cross-linking agent (manufactured by Mitsubishi Gas Chemical Company, Inc., product name: "TETRAD-C") were added to 100 parts of the acrylic polymer (D) in the toluene solution to prepare a pressure-sensitive adhesive composition (D).

Two commercial release liners (manufactured by Mitsubishi Chemical Corporation, product name: "DIAFOIL MRF #50" (biaxially stretched polyester film-based release liners each having a release-treated layer on one surface thereof, thickness: 50 μm)) were prepared. The pressure-sensitive adhesive composition (D) was applied to one surface (release surface) of each of the release liners so that its thickness after drying became 50 μm, followed by drying at 120° C. for 5 minutes. Thus, 50-micrometer thick pressure-sensitive adhesive layers (a first pressure-sensitive adhesive layer and a second pressure-sensitive adhesive layer) each including an acrylic pressure-sensitive adhesive (D) corresponding to the pressure-sensitive adhesive composition (D) were formed on the release surfaces of the two release liners.

A thermosetting polyurethane resin film having a thickness of 100 μm (manufactured by Toray Industries, Inc., caprolactam-based (ester-based) polyurethane resin film having a thickness of 100 μm (100% modulus=1.8 MPa)) was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once. After that, the resultant was aged in an oven at 50° C. for 3 days. Thus, a pressure-sensitive adhesive tape (C3) was obtained.

The results are shown in Table 1.

| | | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|---|
| Polymer | BA/2EHA/AA/4HBA = 68/29/3/0.04 | | 100 | | | | | | | | |
| | BA/VAc/AA/HEA = 100/5/3/0.1 | | | 100 | 100 | 100 | 100 | 100 | 100 | 100 | |
| | BA/VAc/AA/HEA = 100/3/2/0.2 | | | | | | | | | | 100 |
| | BA/AA = 95/5 | | | | | | | | | | |
| | Polymer Tg (° C.) | | −56.9 | −49.4 | −51.3 | −51.3 | −51.3 | −51.3 | −56.9 | −49.4 | −50.3 |
| Tackifier | HARITACK PCJ | | 30 | 10 | 10 | 10 | 10 | 10 | | 10 | |
| | HARITACK SE10 | | | 10 | 10 | 10 | 10 | 10 | 30 | 10 | |
| | HERCOLYN D | | | 5 | 5 | 5 | 5 | 5 | | 5 | |
| | SUMILITE RESIN PR-12603N | | | 15 | 15 | 15 | 15 | 15 | | 15 | |
| | YS POLYSTER S145 | | | | | | | | | | |
| Cross-linking agent | CORONATE | | 3 | 2 | 2 | 2 | 2 | 2 | 3 | 2 | 30 |
| | TETRAD-C | | | | 0.2 | 0.6 | 0.2 | 0.6 | | | 2 |
| Pigment | NAF-5091 BLACK | | | | | | | | | | 0.01 |
| | Base material | | Thermosetting polyurethane resin | Thermosetting polyurethane resin | Thermosetting urethane acrylate resin | Thermosetting urethane acrylate resin | Thermosetting polyurethane resin | Thermosetting polyurethane resin | Thermoplastic polyurethane resin | Thermoplastic polyurethane resin | Thermosetting polyurethane resin |
| Storage modulus of elasticity (Pa) | Pressure-sensitive adhesive layer G' | −25° C. to 120° C. Maximum | 3.0E+07 | 3.2E+08 | 5.9E+07 | 5.4E+07 | 5.9E+07 | 5.4E+07 | 3.0E+07 | 3.2E+08 | 6.1E+08 |
| | Base material layer E' | −25° C. to 120° C. Maximum | 5.8E+06 | 5.8E+06 | 6.5E+06 | 6.5E+06 | 5.8E+06 | 5.8E+06 | 1.5E+08 | 1.5E+08 | 5.8E+06 |
| | | −25° C. to 120° C. Minimum | 5.0E+06 | 5.0E+06 | 3.7E+06 | 3.7E+06 | 5.0E+06 | 5.0E+06 | 9.2E+06 | 9.2E+06 | 5.0E+06 |
| | Entirety of double-sided pressure-sensitive adhesive tape E' | −25° C. to 120° C. Maximum | 7.5E+06 | 9.6E+07 | 3.8E+07 | 3.0E+07 | 4.8E+07 | 2.1E+07 | 1.2E+08 | 2.8E+08 | 1.1E+08 |
| | | −25° C. to 120° C. Minimum | 2.3E+06 | 2.3E+06 | 2.1E+06 | 1.7E+06 | 2.2E+06 | 1.5E+06 | 2.0E+06 | 1.7E+06 | 2.8E+06 |
| | | −25° C. | 7.5E+06 | 9.6E+07 | 3.8E+07 | 3.0E+07 | 4.8E+07 | 2.1E+07 | 1.2E+08 | 2.8E+08 | 1.1E+08 |
| | | 23° C. | 2.3E+06 | 2.3E+06 | 2.1E+06 | 1.7E+06 | 2.2E+06 | 1.5E+06 | 1.2E+07 | 1.3E+07 | 2.8E+06 |
| | | 80° C. | 2.5E+06 | 2.9E+06 | 2.2E+06 | 1.9E+06 | 2.8E+06 | 1.6E+06 | 6.0E+06 | 5.3E+06 | 2.8E+06 |
| | | (−25° C./80° C.) | 3.00 | 33.10 | 17.27 | 15.79 | 17.14 | 13.13 | 20.00 | 52.83 | 39.29 |
| Impact-absorbing property (MPa) | | −25° C. | 15 | 16 | 15 | 16 | 15 | 14 | 17 | 21 | 17 |
| | | 23° C. | 11 | 14 | 13 | 12 | 12 | 11 | 16 | 14 | 13 |
| | | 80° C. | 14 | 12 | 13 | 13 | 12 | 13 | 15 | 19 | 14 |
| Pressure-sensitive adhesive strength (N/20 mm) | | | 12 | 15 | 11 | 10 | 14 | 12 | 11 | 12 | 10 |

INDUSTRIAL APPLICABILITY

The double-sided pressure-sensitive adhesive tape according to the embodiment of the present invention is excellent in impact-absorbing property in the entirety of a wide temperature range, in particular, in a low-temperature region. The double-sided pressure-sensitive adhesive tape according to the embodiment of the present invention may be utilized as, for example, an impact-absorbing tape for a display by taking advantage of the feature.

REFERENCE SIGNS LIST

1000 double-sided pressure-sensitive adhesive tape
100 base material layer
200a pressure-sensitive adhesive layer
200b pressure-sensitive adhesive layer

The invention claimed is:

1. A double-sided pressure-sensitive adhesive tape, comprising:
   a base material layer that contains at least one polar functional group-containing polymer selected from a condensation-type polymer and a polyaddition-type polymer, wherein
   the at least one polar functional group-containing polymer is a polyurethane and has a carbonyl group in its polymer main chain as a polar functional group, and wherein
   the base material layer is a non-foamed layer; and
   pressure-sensitive adhesive layers arranged on both surface sides of the base material layer,
   wherein an entirety of the double-sided pressure-sensitive adhesive tape has a storage modulus of elasticity E' in a range of from $5.0 \times 10^5$ Pa to $1.0 \times 10^8$ Pa, which is measured at from $-25°$ C. to $120°$ C. and a frequency of 1 Hz.

2. The double-sided pressure-sensitive adhesive tape according to claim 1, wherein the base material layer has a storage modulus of elasticity E' in a range of from $1.0 \times 10^5$ Pa to $1.0 \times 10^8$ Pa, which is measured at from $-25°$ C. to $120°$ C. and a frequency of 1 Hz.

3. The double-sided pressure-sensitive adhesive tape according to claim 1, wherein the pressure-sensitive adhesive layers each have a maximum of a storage modulus of elasticity G' of $1.0 \times 10^{10}$ Pa or less, which is measured at from $-25°$ C. to $120°$ C. and a frequency of 1 Hz.

4. The double-sided pressure-sensitive adhesive tape according to claim 1, wherein the pressure-sensitive adhesive layers each have a pressure-sensitive adhesive strength to a SUS plate of 5 N/20 mm or more at $23°$ C. and 50% RH, a tensile rate of 300 mm/min, and a peel angle of $180°$.

5. The double-sided pressure-sensitive adhesive tape according to claim 1, wherein the polar functional group-containing polymer has at least one kind selected from an ether bond and an ester bond.

6. The double-sided pressure-sensitive adhesive tape according to claim 1, wherein the pressure-sensitive adhesive layers each contain at least one kind selected from an acrylic pressure-sensitive adhesive, a rubber-based pressure-sensitive adhesive, a silicone-based pressure-sensitive adhesive, and a urethane-based pressure-sensitive adhesive.

7. The double-sided pressure-sensitive adhesive tape according to claim 1, wherein the double-sided pressure-sensitive adhesive tape is an impact-absorbing tape for a display.

* * * * *